(12) United States Patent
Kato et al.

(10) Patent No.: US 11,699,935 B2
(45) Date of Patent: Jul. 11, 2023

(54) MOTOR

(71) Applicant: AISAN KOGYO KABUSHIKI KAISHA, Obu (JP)

(72) Inventors: Nobuhiro Kato, Tokai (JP); Takashige Inagaki, Obu (JP); Hidemasa Torii, Anjo (JP); Keiji Nakaya, Nisshin (JP); Takuhito Fujiwara, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 297 days.

(21) Appl. No.: 17/260,625

(22) PCT Filed: Jul. 19, 2019

(86) PCT No.: PCT/JP2019/028430
§ 371 (c)(1),
(2) Date: Jan. 15, 2021

(87) PCT Pub. No.: WO2020/022207
PCT Pub. Date: Jan. 30, 2020

(65) Prior Publication Data
US 2021/0281140 A1   Sep. 9, 2021

(30) Foreign Application Priority Data

Jul. 23, 2018  (JP) ................... 2018-137526

(51) Int. Cl.
*F16C 19/06* (2006.01)
*H02K 5/173* (2006.01)
(Continued)

(52) U.S. Cl.
CPC ........... *H02K 5/1732* (2013.01); *F16C 19/06* (2013.01); *F16C 33/58* (2013.01); *F16C 35/07* (2013.01);
(Continued)

(58) Field of Classification Search
CPC ...... H02K 5/1732; H02K 7/083; F16C 19/06; F16C 33/58; F16C 35/07; F16C 2380/25
(Continued)

(56) References Cited

U.S. PATENT DOCUMENTS

2006/0062505 A1* 3/2006 Hoefs ............... H02K 7/083
384/517

FOREIGN PATENT DOCUMENTS

| JP | H0398473 A | 4/1991 |
| JP | H06200950 A | 7/1994 |

(Continued)

OTHER PUBLICATIONS

PCT/JP2019/028430 International Search Report and Written Opinion dated Oct. 8, 2019 (10 p.).
(Continued)

*Primary Examiner* — Terrance L Kenerly
(74) *Attorney, Agent, or Firm* — Conley Rose, P.C.

(57) ABSTRACT

A motor includes a stator and a rotor having a rotor shaft. The motor includes a bearing having an inner ring and an outer ring that are configured to rotate relative to each other. The inner ring is supported by the rotor shaft. The motor also includes a holder that supports the outer ring. The holder is clearance-fitted to a retainer on a stator side. A rotation prevention apparatus configured to prevent the rotation of the holder is positioned between the holder and a stopper member on the stator side.

8 Claims, 14 Drawing Sheets

(51) Int. Cl.
  *F16C 33/58* (2006.01)
  *F16C 35/07* (2006.01)
  *H02K 7/08* (2006.01)

(52) U.S. Cl.
  CPC .......... *H02K 7/083* (2013.01); *F16C 2380/26* (2013.01)

(58) Field of Classification Search
  USPC .......................................................... 310/90
  See application file for complete search history.

(56) References Cited

FOREIGN PATENT DOCUMENTS

| JP | H0775313 A | 3/1995 |
| JP | H10311342 A | 11/1998 |
| JP | 2000156952 A | 6/2000 |
| JP | 2003061299 A | 2/2003 |
| JP | 2003284363 A | 10/2003 |
| JP | 2006077881 A | 3/2006 |
| JP | 2010226927 A | 10/2010 |
| JP | 2012151980 A | 8/2012 |
| JP | 2013229997 A | 11/2013 |
| JP | 2014025547 A | 2/2014 |
| JP | 2015084646 A | 4/2015 |
| JP | 2016131445 A | 7/2016 |

OTHER PUBLICATIONS

PCT/JP2019/028430 Article 34 Amendment dated May 22, 2020 (12 p.).
PCT/JP2019/028430 International Preliminary Reporton Patentability dated Jan. 28, 2021 (11 p.).
Japanese Office Action dated Oct. 6, 2021, for Japanese Application No. 2018-137526 (5 p.).
English Translation of Japanese Office Action dated Oct. 6, 2021, for Japanese Application No. 2018-137526 (5 p.).

* cited by examiner

US 11,699,935 B2

MOTOR

CROSS-REFERENCE TO RELATED APPLICATIONS

The present application is a 35 U.S.C. § 371 U.S. National Phase entry of, and claims to the benefit of, PCT Application No. PCT/JP2019/028430, filed Jul. 19, 2019, which claims priority to Japanese Patent Application No. 2018-137526, filed Jul. 23, 2018, each of which is incorporated herein by reference in its entirety for all purposes.

STATEMENT REGARDING FEDERALLY SPONSORED RESEARCH OR DEVELOPMENT

Not applicable.

BACKGROUND

The present disclosure generally relates to motors.

One type of a motor includes a stator and a rotor having a rotor shaft (see Japanese Laid-Open Patent Publication No. 2012-151980). The motor includes a bearing and a bracket. The bearing includes an inner ring and an outer ring, which rotate relative to each other. The inner ring of the bearing supports the rotor shaft. The outer ring of the bearing is supported by the bracket. The bracket includes a resin part and a metal plate part, within which the resin part is fitted by press-fitting. The outer ring of the bearing is fitted in the resin part by press-fitting. The metal part is fitted into a fixed member of the stator by press-fitting.

SUMMARY

In one aspect of this disclosure, a motor includes a stator and a rotor having a rotor shaft. The motor includes a bearing including an inner ring and an outer ring configured to rotate relative to each other and a holder supporting the outer ring. The inner ring supports the rotor shaft. The holder is disposed within a fixed member on the stator side with a substantially annular gap formed therebetween. A rotation prevention apparatus configured to prevent the holder from rotating relative to the fixed member is provided between the fixed member and the holder.

In accordance with the aspect, the holder supporting the outer ring of the bearing is loosely fitted with the fixed member on the stator side, and rotation of the holder with respect to the fixed member is prevented by the rotation prevention apparatus. Thus, it is not necessary to attach the holder to the fixed member by press-fitting. This beneficially simplifies accuracy management for the assembling process of the bearing, thereby decreasing the cost thereof.

DETAILED DESCRIPTION

As previously described, Japanese Laid-Open Patent Publication No. 2012-151980 discloses a motor including a bracket that is composed of a resin part and a metal plate part. The metal plate part of the bracket is pressed into a fixed member of a stator. Accordingly, precise control of the dimensions of the metal plate part and the fixed member is necessary during manufacture thereof. This results in high cost. Therefore, there has been a need for improved motors.

Embodiments of the present disclosure will be described below with reference to drawings.

Figure 1:
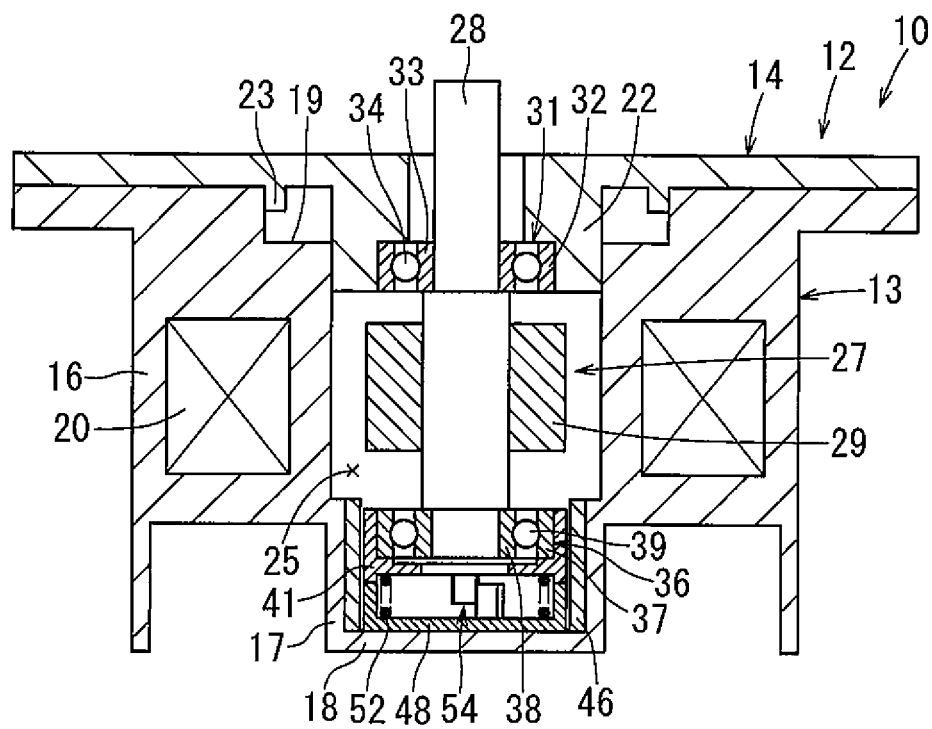
FIG. 1 is a cross-sectional view of a first embodiment of a motor in accordance with the principles described herein.

FIG. 1 is a cross-sectional view of a motor 10. Upward, downward, rightward, and leftward directions of the motor 10 are set on the basis of FIG. 1. However, it should be understood that such directions do not limit the possible installation orientations of the motor 10. As shown in FIG. 1, the motor 10 includes a casing 12 that functions as an outer shell. The casing 12 is divided into two parts—a casing body 13 and a lid member 14 positioned axially above (the vertical direction in FIG. 1) and mounted atop the casing body 13. The casing body 13 and the lid member 14 are fastened to each other by a plurality of bolts, or the like.

The casing body 13 includes a radially outer tubular wall part 16 having a hollow, vertically extending cylindrical shape, a radially inner extending tubular part 17 extending downward from an inner circumference of a lower surface of the tubular wall part 16, and a bottom wall part 18 closing a lower end of the extending tubular part 17. A radially inner circumferential part of an upper end of the tubular wall part 16 is lower than a radially outer circumferential part thereof, so as to define an annular stepped recess 19. In this embodiment, the casing body 13 is made of resin.

An annular stator 20 is enclosed and buried within the tubular wall part 16 of the casing body 13 by insert molding. The stator 20 includes stator cores, stator coils, etc. The stator 20 is entirely surrounded and covered with the resin forming the tubular wall part 16.

The lid member 14 has an annular plate shape. The lid member 14 includes a boss part 22 having a hollow cylindrical shape coaxially extending downward from a radially inner circumference of the lid member 14. The boss part 22 is fitted in an upper end of the tubular wall part 16 of the casing body 13. The lid member 14 includes an annular fitting tubular part 23 having a hollow cylindrical shape concentrically extending downward from the lid member 14. The boss part 22 and the fitting tubular part 23 are coaxially arranged such that the boss part 22 extends within the fitting tubular part 23. The fitting tubular part 23 is coaxially fitted in the stepped recess 19 of the casing body 13. In this embodiment, the lid member 14 is made of resin.

The casing body 13 and the lid member 14 of the casing 12 define a motor chamber 25. A rotor 27 is rotatably disposed within the motor chamber 25 of the casing 12. The rotor 27 includes a rotor shaft 28 and a plurality of permanent magnets 29 disposed about the rotor shaft 28. The rotor shaft 28 may be made of metal. The permanent magnets 29 are circumferentially arranged around an axial center of the rotor shaft 28 such that N poles and S poles thereof are alternately aligned in a circumferential direction.

The rotor shaft 28 is rotatably supported by a bearing 31 disposed in the boss part 22 of the lid member 14 in a position above the permanent magnets 29. The bearing 31 is a ball bearing including an outer ring 32, an inner ring 33, and a plurality of circumferentially arranged balls 34 interposed between the outer ring 32 and the inner ring 33. The rotor shaft 28 is fitted into the inner ring 33 from below by press-fitting. The outer ring 32 is pressed into the boss part 22 of the lid member 14 from below. An upper end of the rotor shaft 28 serves as an output end and protrudes axially upward through the boss part 22 of the lid member 14.

A lower end of the rotor shaft 28 is rotatably supported by a support structure disposed in the extending tubular part 17 of the casing body 13. The lower end of the rotor shaft 28 is opposite to the output end, and thus may also be referred to as non-output end. The support structure for the non-output end of the rotor shaft 28 will be described below. In this disclosure, the support structure for the non-output end of the rotor shaft 28 may be also referred to as a support structure for the rotor shaft 28.

Although not shown in the drawings, a control circuit configured to control power fed to the stator 20 is disposed in a lower part of the casing body 13. The casing 13 includes a connector part, which is electrically connected to the control circuit and is configured to be coupled with an external connector linked to an external power source. The motor 10 is driven by electric power supplied from the external power source.

Figure 2:
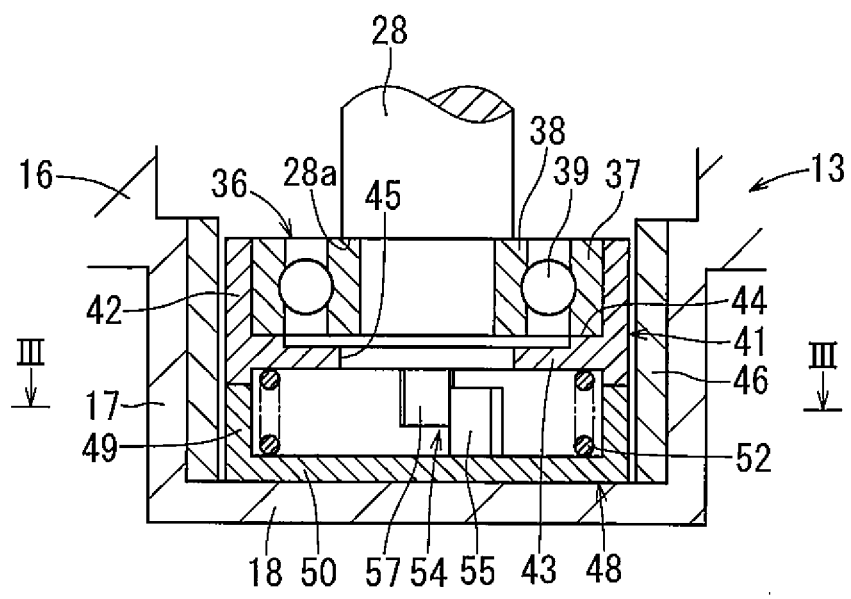
FIG. 2 is an enlarged partial cross-sectional view of the support structure for the rotor shaft of the motor of FIG. 1.

FIG. 2 is a cross-sectional view of the support structure for the rotor shaft 28. As shown in FIG. 2, a retainer 46 having a hollow cylindrical shape is fixedly disposed in the extending tubular part 17 of the casing body 13, for instance by insert molding, press-fitting, or the like. Although the retainer 46 is made of metal in this embodiment, in other embodiments it may instead be made of resin.

A stopper member 48 having a closed bottom, cylindrical shape is coaxially disposed within the retainer 46 and the bottom wall part 18 of the casing body 13, and is fixably attached to the bottom wall part 18 by, for instance adhesion or the like. The stopper member 48 includes a side wall part 49 having a hollow cylindrical shape, and a bottom wall part 50 closing a lower end of the side wall part 49. The side wall part 49 is loosely fitted in the retainer 46. In other words, the side wall part 49 is positioned within the retainer 46 with a substantially annular gap formed radially therebetween, such that the side wall part 49 is spaced apart from the retainer 46 in a radial direction of the retainer 46. Thus, as used herein, the term "loose-fit" or the like means that one member is disposed within the other member with a substantially annular gap formed therebetween. Although the stopper 48 is made of metal in this embodiment, in other embodiments, it may instead be made of resin.

The diameter of the lower end of the rotor shaft 28 is smaller than the diameter of an axial center of the rotor shaft 28, so that the rotor shaft 28 has a stepped surface 28a having an annular shape extending radially between an outer circumference of the axial center of the rotor shaft 28 and an outer circumference of the lower end of the rotor shaft 28. The non-output end of the rotor shaft 28 is pressed into an inner ring 38 of a bearing 36, which is a ball bearing. The inner ring 38 abuts on the stepped surface 28a of the rotor shaft 28, so as to prevent further insertion of the rotor shaft 28. The bearing 36 includes an outer ring 37, the inner ring 38, and a plurality of circumferentially arranged balls 39 interposed between the outer ring 37 and the inner ring 38. The outer ring 37 of the bearing 36 is disposed in a holder 41 having a bottomed cylindrical shape.

The holder 41 includes a side wall part 42 having a hollow cylindrical shape and a bottom wall part 43 closing a lower end of the side wall part 42. The bottom wall part 43 includes a seating face 44 on an upper surface of a radially outer circumference thereof, such that the seating face 44 is higher than an upper surface of a radially inner circumference of the bottom wall part 43 by one step. The bottom wall part 43 has a communication hole 45 extending vertically through a center of the bottom wall part 43. The outer ring 37 is fitted within the side wall part 42 of the holder 41, for instance by press-fitting. As a result, the outer ring 37 is integrated with the holder 41 such that the outer ring 37 does not move relative to the holder 41. The outer ring 37 abuts the seating face 44 of the holder 41, so as to prevent further insertion of the outer ring 37. Although the holder 41 is made of metal in this embodiment, in other embodiments it may instead be made of resin. The outer ring 37 may be coupled with the holder 41 by adhesion or the like.

The side wall part 42 of the holder 41 is loosely fitted within the retainer 46, with an annular gap formed therebetween. The side wall part 42 of the holder 41 is coaxially aligned with and disposed on the side wall part 49 of the stopper member 48. In other words, a lower surface of the side wall part 42 of the holder 41 abuts or is close to an upper surface of the side wall part 49 of the stopper member 48.

A spring 52 comprising a coil spring is interposed between the bottom wall part 43 of the holder 41 and the bottom wall part 50 of the stopper member 48. The spring 52 biases the holder 41 upward. The spring 52 has substantially the same diameter as the outer ring 37 of the bearing 36. The spring 52 applies a preloaded force to the outer ring 37, via the holder 41, so as to reduce rattling of the balls 39 of the bearing 36.

One rotation prevention assembly or apparatus 54, which is configured to prevent rotation of the holder 41, is provided between the stopper member 48 and the holder 41. The rotation prevention apparatus 54 includes an engaging projection 55 formed on the stopper member 48 and an engaged projection 57 formed on the holder 41. The engaged projection 57 is configured to engage with the engaging projection 55 in a circumferential direction about the central axis of the holder 41.

Figure 3:
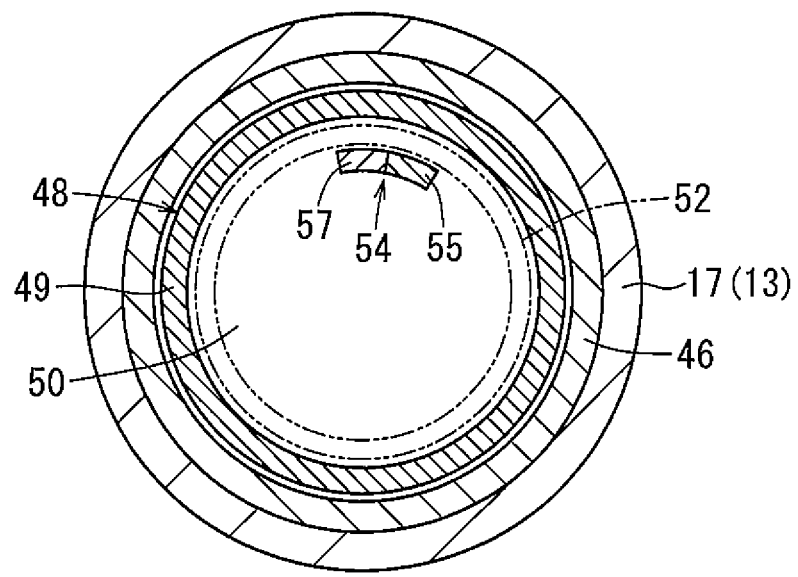
FIG. 3 is a cross-sectional view of the support structure of FIG. 1, taken along line III-III of FIG. 2.

The engaging projection 55 protrudes upward from the upper surface of the bottom wall part 50 of the stopper member 48. In this embodiment, the engaging projection 55 has a rectangular plate shape with a predetermined width measured in a circumferential direction about the axis of the stopper member 48 and a predetermined thickness measured in a radial direction. The engaging projection 55 is disposed near a radially inner circumference of the spring 52 (see FIG. 3). The engaging projection 55 is curved in an arc shape along a circumferential line, as seen in the top view illustrated in FIG. 3. The engaging projection 55 is integral with the stopper member 48.

As illustrated in FIG. 2, the engaged projection 57 protrudes downward from the lower surface of the bottom wall part 43 of the holder 41. The engaged projection 57 has a rectangular plate shape with a predetermined width measured in a circumferential direction about the axis of the holder 41 and a predetermined thickness measured in a radial direction. The engaged projection 57 is disposed near the radially inner circumference of the spring 52 (see FIG. 3). The engaged projection 57 is disposed on a circumferential line having the same diameter as the engaging projection 55. The engaged projection 57 is curved in an arc shape along the circumferential line, as seen in the top view illustrated in FIG. 3. The engaged projection 57 is integral with the holder 41.

When the retainer 46 is loosely fitted within the holder 41, the engaged projection 57 is circumferentially spaced apart from the engaging projection 55. They are so positioned in an internal space of the stopper member 48. Then, when the rotor shaft 28 rotates, rotary motion of the shaft 28 is transmitted to the outer ring 37 and the holder 41 via the inner ring 38 and the balls 39. As a result, the holder 41 rotates until the engaged projection 57 comes into contact with the engaging projection 55 (see FIG. 3). After that, the stopper member 48 prevents the holder 41 from further rotating, due to the engagement between the engaging projection 55 and the engaged projection 57. Accordingly, sliding of holder 41 on the retainer 46 caused by rotation of the holder 41 can be prevented. This suppresses heat generation, an increase in current consumption, and so on, that can otherwise be caused by the holder 41 sliding on the retainer 46. In this disclosure, the casing body 13, the retainer 46, and the stopper member 48 may be collectively referred to as a "fixed member." The engaging projection 55 may also be referred to as an "engaging part" herein. The engaged projection 57 may also be referred to as an "engaged part" herein.

In accordance with the motor 10 of the present embodiment, when the holder 41 supporting the outer ring 37 of the bearing 36 is loosely fit within the retainer 46, such that there is a substantially annular gap formed therebetween, the rotation prevention apparatus 54 prevents the holder 41 from rotating relative to the stopper member 48. Thus, it is not necessary to press the holder 41 into the retainer 46 by press-fitting to prevent relative rotation therebetween. Accordingly, the dimensional accuracy required for the assembling process of the bearing 36 can be decreased, thereby reducing the costs thereof. In addition, the holder 41 of the present embodiment may be formed as single member, so that the cost for the holder 41 can be decreased in comparison with a conventional bracket composed of two components.

The rotation prevention apparatus 54 is composed of the engaging projection 55 formed on the stopper member 48 and the engaged projection 57 formed on the holder 41. The engaging projection 55 and the engaged projection 57 are configured to engage each other in the circumferential direction of the holder 41. Thus, rotation of the holder 41 can be prevented, without the need for any additional members. Accordingly, an increase in the cost for the rotation prevention apparatus 54 can be suppressed. In addition, the engaging projection 55 can be easily formed by various methods, such as integral molding with the stopper member 48. The engaged projection 57 can also be easily formed by various methods, such as integral molding with the holder 41.

Both the engaging projection 55 and the engaged projection 57 of the rotation prevention apparatus 54 have a protruding shape. The engaging projection 55 and the engaged projection 57 are positioned and arranged on the same circumferential line about the axis of the holder 41. Accordingly, the engaging projection 55 may easily engage the engaged projection 57. In some embodiments, the number of the rotation prevention apparatus 54 may be increased.

In the case where the holder 41 and the stopper member 48, on which the spring 52 abuts, are made of metal, abrasive wear of the holder 41 and the stopper member 48 can be decreased in comparison with the case where they are made of resin.

Even if the bottom wall part 43 of the holder 41 does not have the communication hole 45, an internal space of the retainer 46 may be closed and sealed with the holder 41 during attaching the holder 41 to the retainer 46. In such state, air might be compressed in the internal space of the retainer 46, so that assembling workability of the holder 41 to the retainer 46 becomes worse. In a case of the present embodiment, the bottom wall part 43 of the holder 41 has the communication hole 45 vertically passing therethrough. Thus, when attaching the holder 41 to the retainer 46, air can be released from the internal space of the retainer 46 via the communication hole 45. Consequently, the assembling workability of the holder 41 and the retainer 46 can be improved. The air discharged from the communication hole 45 flows into the motor chamber 25 via a space between the holder 41 and the outer ring 37 of the bearing 36 and a space between the outer ring 37 and the inner ring 38.

Figure 4:
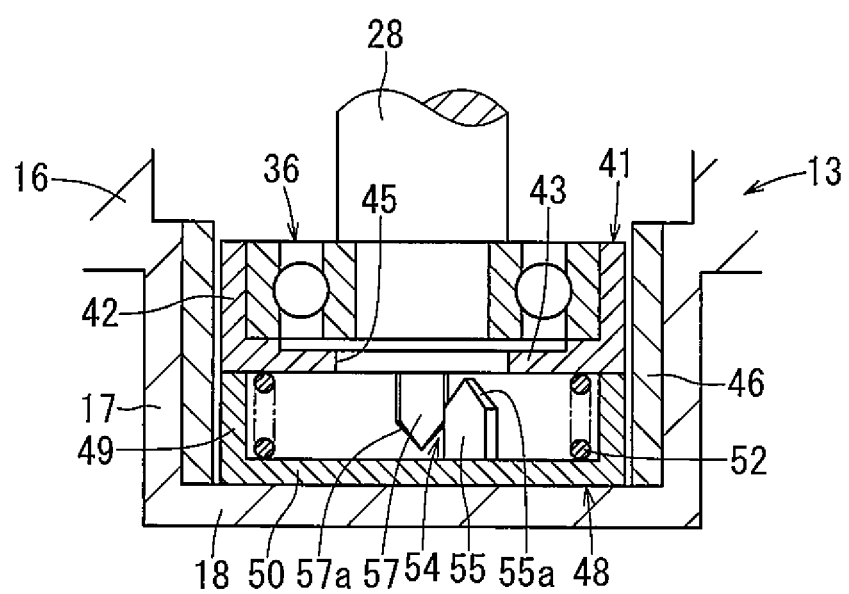
FIG. 4 is an enlarged partial cross-sectional view of a second embodiment of a support structure for a rotor shaft of a motor in accordance with the principles described herein.
Figure 5:
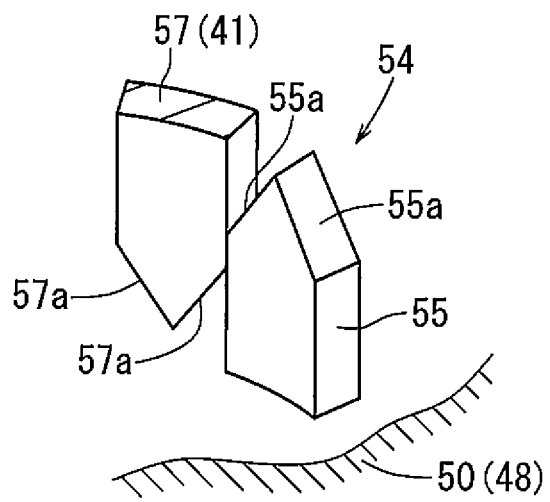
FIG. 5 is an enlarged perspective view of the rotation prevention apparatus of the support structure of FIG. 4.

A second embodiment similar to the first embodiment, with some changes to the rotation prevention apparatus 54 will now be described. For purpose of clarity and conciseness, the changes will be described, while redundant explanations will be omitted. FIG. 4 is a cross-sectional view of the support structure for the rotor shaft 28. FIG. 5 is a perspective view of the rotation prevention apparatus 54.

As shown in FIG. 4, an upper end of the engaging projection 55 has a triangular shape tapering upward, as viewed in the radial direction of the stopper member 48. That is, as shown in FIG. 5, a pair of inclined guide surfaces 55a are formed at the upper end of the engaging projection 55 in a line-symmetric manner. In other embodiments, the pair of the inclined guide surfaces 55a may be asymmetrically formed.

As shown in FIG. 4, a lower end of the engaged projection 57 has a triangular shape tapering downward, as viewed in the radial direction of the holder 41. That is, as shown in FIG. 5, a pair of inclined guide surfaces 57a are formed at the lower end of the engaged projection 57 in a line-symmetric manner. In other embodiments, the pair of the inclined guide surfaces 57a may be asymmetrically formed.

In accordance with the second embodiment, the inclined guide surfaces 55a formed on the engaging projection 55 and the inclined guide surfaces 57a formed on the engaged projection 57 can decrease the interaction between the engaging projection 55 and the engaged projection 57 during an attaching process of the holder 41 with the retainer 46. More specifically, when the engaging projection 55 comes into contact with the engaged projection 57 during the assembling process of the holder 41 with the retainer 46, one of the guide surfaces 57a of the engaged projection 57 slides along one of the guide surfaces 55a of the engaging projection 55. As a result of the sliding contact, the engaging projection 55 is moved in the circumferential direction such that the holder 41 is rotated. Thus, the interaction between the engaging projection 55 and the engaged projection 57 can be decreased. The number of the guide surfaces 55a formed on the engaging projection 55 and the number of the guide surface 57a formed on the engaged projection 57 may be at least one.

Figure 6:
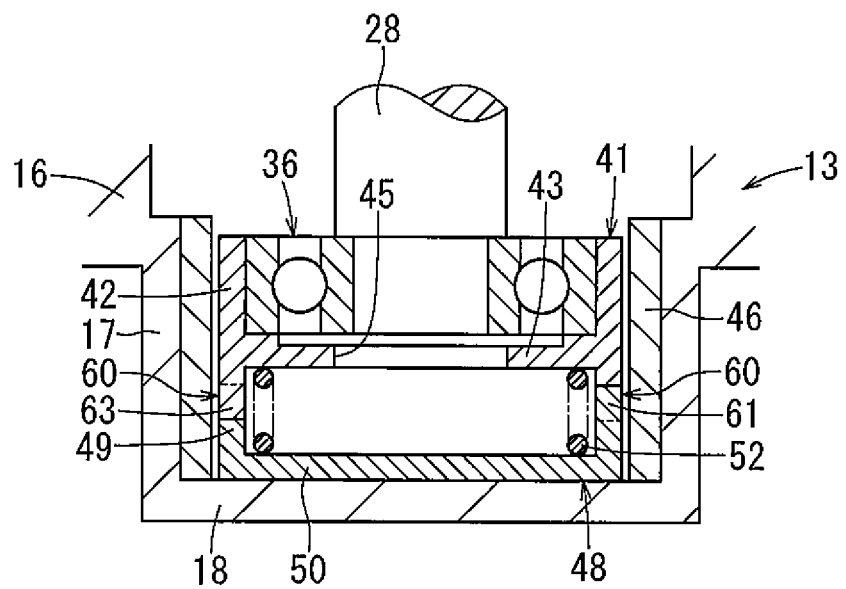
FIG. 6 is a cross-sectional view of a third embodiment of a support structure for a rotor shaft of a motor in accordance with the principles described herein.
Figure 7:
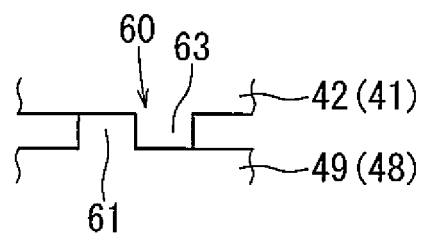
FIG. 7 is an enlarged side view of the rotation prevention apparatus of the support structure of FIG. 6.

A third embodiment similar to the first embodiment, with some changes to the rotation prevention apparatus 54 will now be described. For purpose of clarity and conciseness, the changes will be described, while redundant explanations will be omitted. FIG. 6 is a cross-sectional view of the support structure for the rotor shaft 28. FIG. 7 is a side view of a rotation prevention apparatus 60.

As shown in FIG. 6, the third embodiment includes a pair of rotation prevention apparatus 60 arranged in a point symmetric manner, instead of the rotation prevention apparatus 54 of the first embodiment. Each of the rotation prevention apparatus 60 of this embodiment is composed of an engaging projection 61 formed on the side wall part 49 of the stopper member 48 and an engaged projection 63 formed on the side wall part 42 of the holder 41. The engaged projection 63 is configured to engage the engaging projection 61 in the circumferential direction about the axis of the holder 41.

The engaging projection 61 protrudes upward from an upper surface of the side wall part 49 of the stopper member 48 (see FIG. 7). The engaging projection 61 has a rectangular shape with a predetermined width measured in the circumferential direction of the side wall part 49. The engaging projection 61 is curved in an arc shape along the side wall part 49. The engaging projection 61 is integral with the stopper member 48.

The engaged projection 63 protrudes downward from a lower surface of the side wall part 42 of the holder 41 (see FIG. 7). The engaged projection 63 has a rectangular shape with a predetermined width measured in the circumferential direction of the side wall part 42. The engaged projection 63 is curved in an arc shape along the side wall part 42. The engaged projection 63 is integral with the holder 41. The engaging projection 61 may also be referred to as an "engaging part" herein. The engaged projection 63 may also be referred to as an "engaged part" herein. The number of the rotation prevention apparatus 60 may be changed to one pair or more than two pairs.

Figure 8:
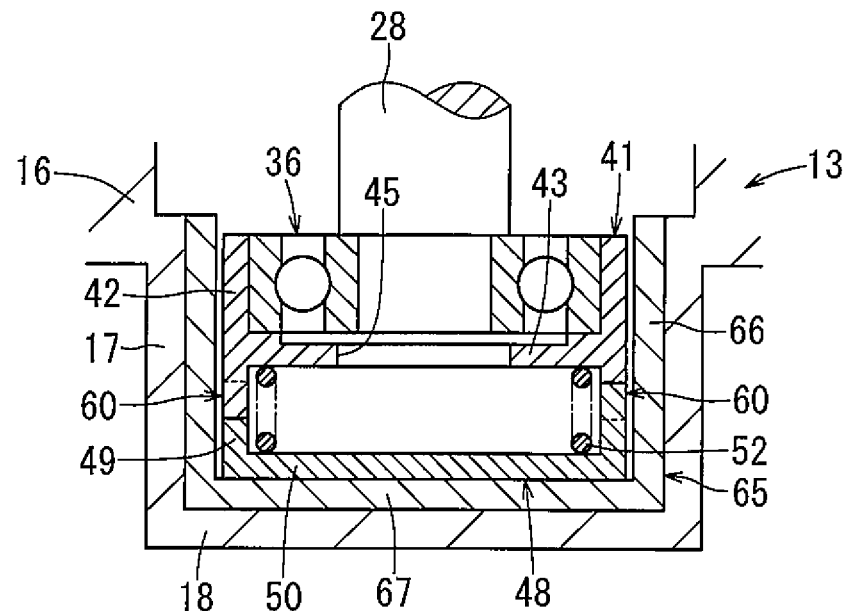
FIG. 8 is an enlarged cross-sectional view of a fourth embodiment of a support structure for a rotor shaft of a motor in accordance with the principles described herein.

A fourth embodiment similar to the third embodiment, with some changes to the retainer 46 will now be described. For purpose of clarity and conciseness, the changes will be described, while redundant explanations will be omitted. FIG. 8 is a cross-sectional view of the support structure for the rotor shaft 28.

As shown in FIG. 8, a retainer 65 of the fourth embodiment is formed in a cylindrical shape having a bottom. The retainer 65 includes a side wall part 66 having a hollow cylindrical shape and a bottom wall part 67 closing a lower end of the side wall part 66. The retainer 65 is fixedly disposed in a recess, which is defined by the extending tubular part 17 and the bottom wall part 18 of the casing body 13. The stopper member 48 is coaxially aligned with and fixed to the bottom wall part 67 of the retainer 65. The retainer 65 may also be referred to as a "fixed member" herein.

Figure 9:
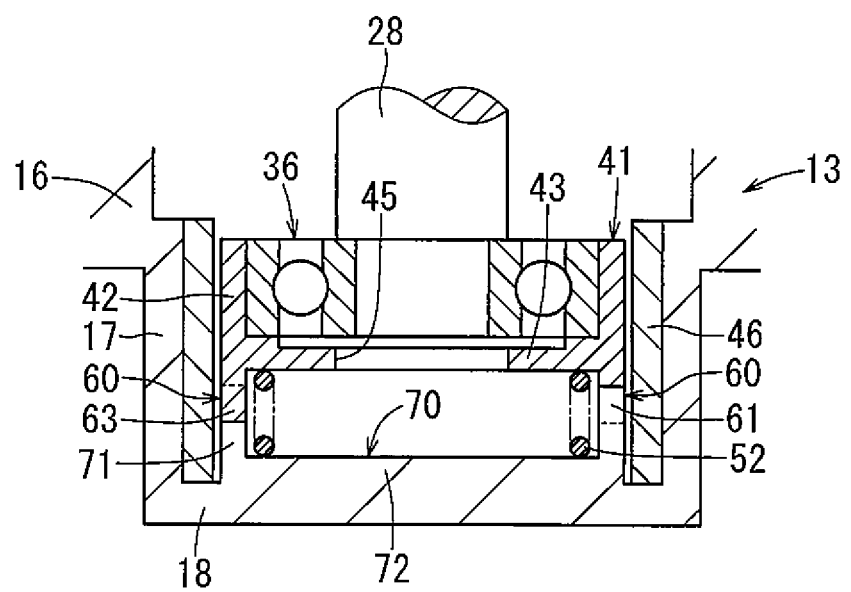
FIG. 9 is an enlarged cross-sectional view of a fifth embodiment of a support structure for a rotor shaft of a motor in accordance with the principles described herein.

A fifth embodiment is similar to the third embodiment, with some changes to the stopper member 48 will now be described. For purpose of clarity and conciseness, the changes will be described, while redundant explanations will be omitted. FIG. 9 is a cross-sectional view of the support structure for the rotor shaft 28.

As shown in FIG. 9, the fifth embodiment includes a stopper part 70, instead of the stopper member 48 of the third embodiment. The stopper part 70 is integrally formed on the bottom wall part 18 of the casing body 13 by molding. The stopper part 70 includes a side wall part 71 and a bottom wall part 72. The side wall part 71 and the bottom wall part 72 have substantially the same shape as the side wall part 49 and the bottom wall part 50 of the third embodiment, respectively (see FIG. 6). The engaging projection 61 is formed on the side wall part 71.

Figure 10:
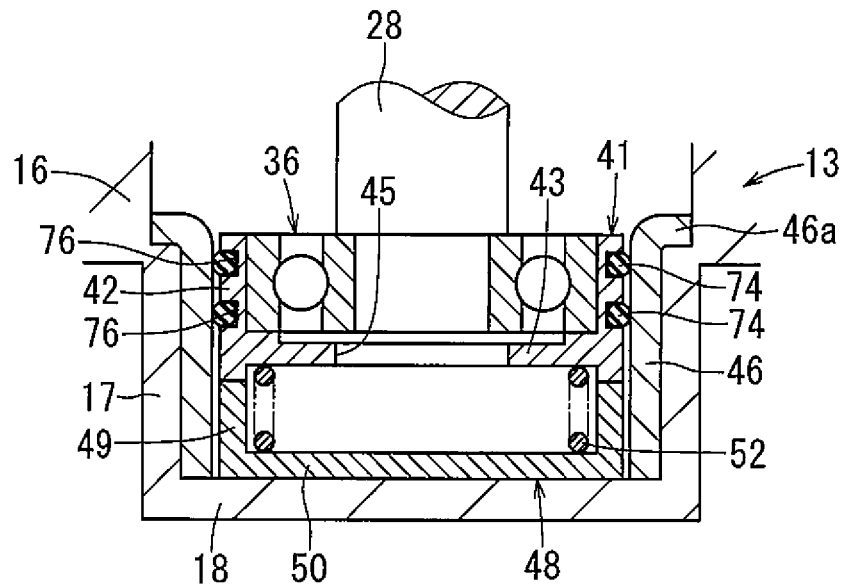
FIG. 10 is an enlarged cross-sectional view of a sixth embodiment of a support structure for a rotor shaft of a motor in accordance with the principles described herein.

A sixth embodiment similar to the third embodiment, with some changes to the rotation prevention apparatus 60 will now be described. For purpose of clarity and conciseness, the changes will be described, while redundant explanations will be omitted. FIG. 10 is a cross-sectional view of the support structure for the rotor shaft 28.

As shown in FIG. 10, the sixth embodiment includes a pair of O-rings 74 as the rotation prevention apparatus, instead of the rotation prevention apparatus 60 of the third embodiment. The lower surface of the side wall part 42 of the holder 41 abuts or is close to the upper surface of the side wall part 49 of the stopper member 48. A pair of vertically spaced annular grooves 76, which extend continuously in the circumferential direction, are formed on an outer circumference of the side wall part 42 of the holder 41. The O-rings 74 are disposed in the annular grooves 76 of the holder 41. Each O-ring 74 is elastically interposed between the retainer 46 and the annular groove 76, so as to close the annular space between the retainer 46 and the annular groove 76 of the holder 41. The O-ring 74 may also be referred to as a "rotation prevention apparatus" or an "elastic member" herein.

In accordance with the sixth embodiment, the rotation prevention apparatus comprises the elastic O-rings 74 interposed between the retainer 46 and the holder 41. That is, the O-rings 74 are configured to prevent the holder 41 from rotating relative to the retainer 46 due to their elastic contact with the retainer 46 and the holder 41. In addition, the O-rings 74 can suppress the transmissions of vibrations from the rotor 27 side to the stator 20 side, thereby improving the quietness of the motor 10. The number of O-rings 74 and the number of the annular grooves 76 may be one or more.

An upper end 46a of the retainer 46 is curved outward in the radial direction. Thus, during the assembling process of the holder 41 with the retainer 46, the holder 41 can be smoothly fitted into the retainer 46 without damaging the O-rings 74.

Figure 11:
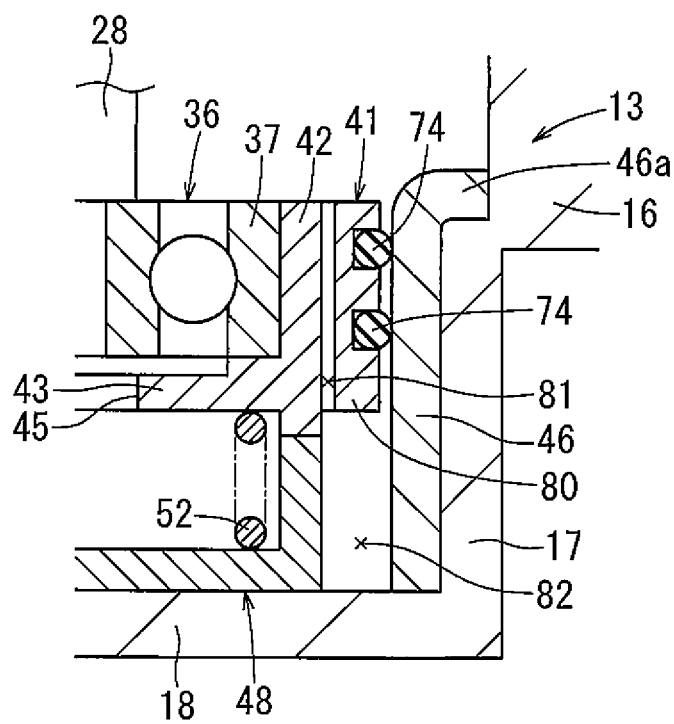
FIG. 11 is an enlarged cross-sectional view of a principle part of a seventh embodiment of a holder of a motor in accordance with the principles described herein.

A seventh embodiment is similar to the sixth embodiment, with some changes to the holder 41 will now be described. For purpose of clarity and conciseness, the changes will be described, while redundant explanations will be omitted. FIG. 11 is a cross-sectional view of a principle part of the holder 41.

As shown in FIG. 11, the thickness of an upper part of the side wall part 42 of the holder 41 of the seventh embodiment is increased in comparison with the holder 41 of the sixth embodiment. Further, a radial distance between the outer ring 37 and the retainer 46 is increased. A thick part 80 of the side wall part 42 of the holder 41 has at least one through hole 81 passing vertically therethrough.

In the sixth embodiment, as shown in FIG. 10, the O-rings 74 are disposed in the annular grooves 76, so as to close the annular space between the retainer 46 and the holder 41. Thus, there is a possibility that an annular space between the retainer 47 and a combination of the holder 41 and the stopper member 48 is closed and sealed during an attaching process of the holder 41 with the retainer 46. In such case, air may be compressed in the annular space, so that the assembling workability of the holder 41 with the retainer 46 becomes worse.

On the other hand, as shown in FIG. 11, the holder 41 has a through hole 81 passing vertically therethrough, such that an annular space 82 between the retainer 46 and the combination of the holder 41 and the stopper member 48 is in communication with an upper space above the holder 41, via the through hole 81. Thus, air can be released from the annular space 82 via the through hole 81 of the holder 41 during the assembling process of the holder 41 with the retainer 46. Accordingly, the assembling workability of the holder 41 with the retainer 46 can be improved.

Figure 12:
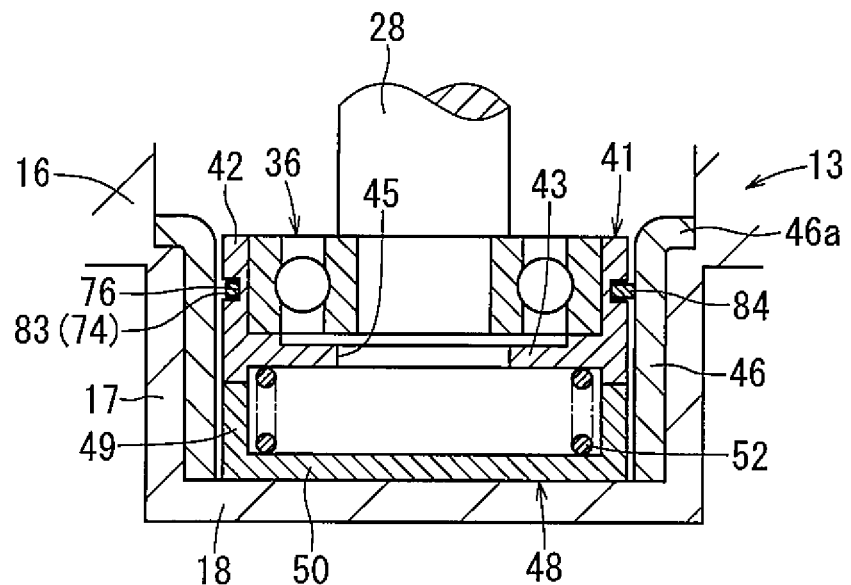
FIG. 12 is an enlarged cross-sectional view of an eighth embodiment of a support structure for a rotor shaft of a motor in accordance with the principles described herein.
Figure 13:
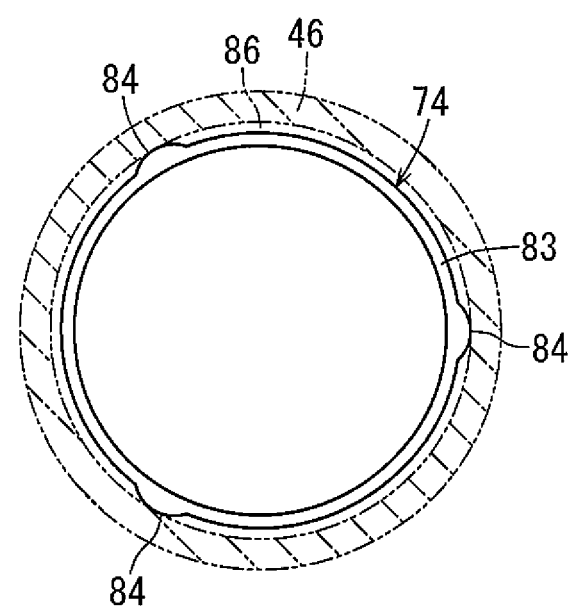
FIG. 13 is a plan view of an O-ring mounted on the support structure of FIG. 12.

An eighth embodiment similar to the sixth embodiment, with some changes will now be described. For purpose of clarity and conciseness, the changes will be described, while redundant explanations will be omitted. FIG. 12 is a cross-sectional view of the support structure for the rotor shaft 28. FIG. 13 is a plan view of an O-ring 74.

As shown in FIG. 12, the eighth embodiment includes one O-ring 74 and one annular groove 76. As shown in FIG. 13, the O-ring 74 of the present embodiment has a ring body 83 having an annular shape and three circumferentially-spaced projections 84 protruding radially outward from an outer circumference of the ring body 83. The projections 84 are arranged in the circumferential direction of the O-ring 74 at regular intervals. The projections 84 of the O-ring 74 abut the retainer 46, such that a gap 86 is formed between the O-ring 74 and the retainer 46. This gap 86 allows the communication between an upper space above the O-ring 74 and a lower space below the same. The projection 84 may also be referred to as a "contact part" herein.

In accordance with the eighth embodiment, the O-ring 74 includes the projections 84 abutting on the retainer 46, so as to define the gap 86 between the O-ring 74 and the retainer 46. Thus, during the assembling process of the holder 41 with the retainer 46, air can be released upward from below, via the gap 86. This helps avoid compression of the air in the lower space below the O-ring 74. Accordingly, the assembling workability of the holder 41 with the retainer 46 can be improved. In general, the number of the projections 84 may be increased or decreased. Alternatively, the projections 84 may be formed on an inner circumference of the O-ring 74, so as to abut the side wall part 42 of the holder 41.

Figure 14:
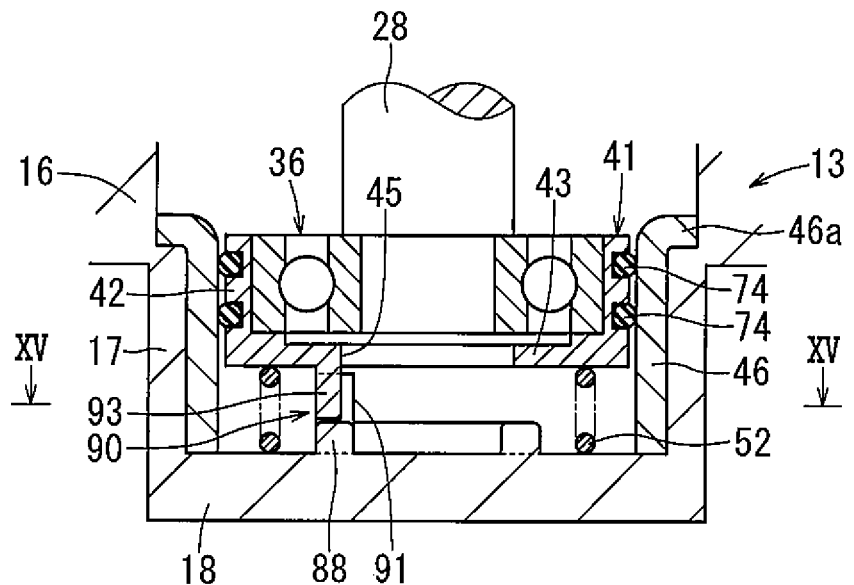
FIG. 14 is an enlarged cross-sectional view of a ninth embodiment of a support structure for a rotor shaft of a motor in accordance with the principles described herein.
Figure 15:
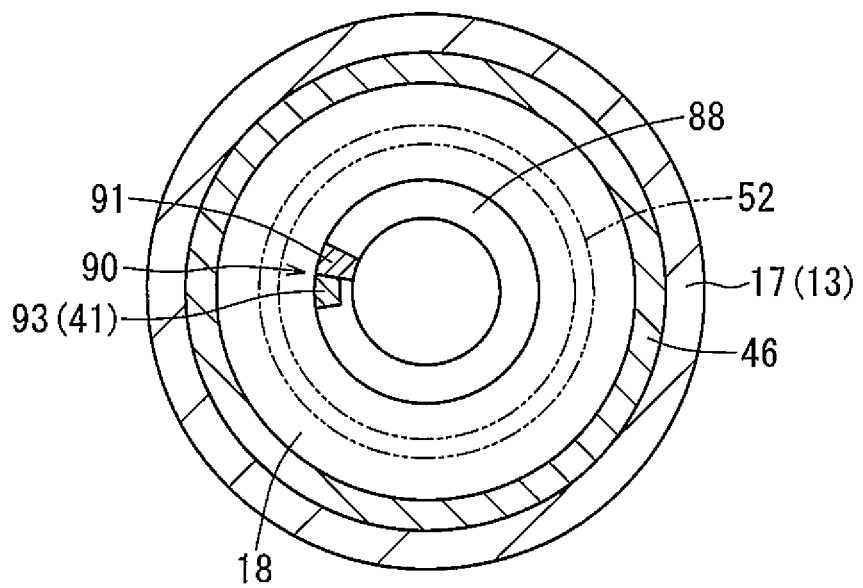
FIG. 15 is a cross-sectional view of the support structure of FIG. 14, taken along line XV-XV of FIG. 14.

A ninth embodiment similar to the sixth embodiment, with some changes will now be described. For purpose of clarity and conciseness, the changes will be described, while redundant explanations will be omitted. FIG. 14 is a cross-sectional view of the support structure for the rotor shaft 28. FIG. 15 is a cross-sectional view along line XV-XV of FIG. 14.

As shown in FIG. 14, the ninth embodiment includes an annular base 88, which is integrally formed on the bottom wall part 18 of the casing body 13 in a coaxial manner, instead of the stopper member 48 of the sixth embodiment.

A rotation prevention apparatus 90 for the holder 41 is provided between the base 88 and the holder 41. The rotation prevention apparatus 90 includes an engaging claw part 91 formed on the base 88 and an engaged claw part 93 formed on the holder 41.

The engaging claw part 91 protrudes upward from an upper surface of the base 88. The engaged claw part 93 protrudes downward from an inner circumference of the bottom wall part 43. As shown in FIG. 15, the engaged claw part 93 is shaped to be capable of engaging with the engaging claw part 91 in a circumferential direction about the axis of the holder 41. The engaging claw part 91 may also be referred to as an "engaging part" herein. The engaged claw part 93 may also be referred to as an "engaged part" herein.

The side wall part 42 of the holder 41 is shaped so that it does not protrude downward from a lower surface of the bottom wall part 43. The spring 52 is interposed between the holder 41 and the bottom wall part 18 of the casing body 13.

In accordance with the ninth embodiment, the number of components can be decreased by omitting the stopper member 48, thereby reducing the cost of the associated motor 10. In addition, the rotation prevention apparatus 90 is disposed inside the spring 52. Thus, the diameter of the spring 52 can be increased, so as to improve the stability of the spring 52.

Figure 16:
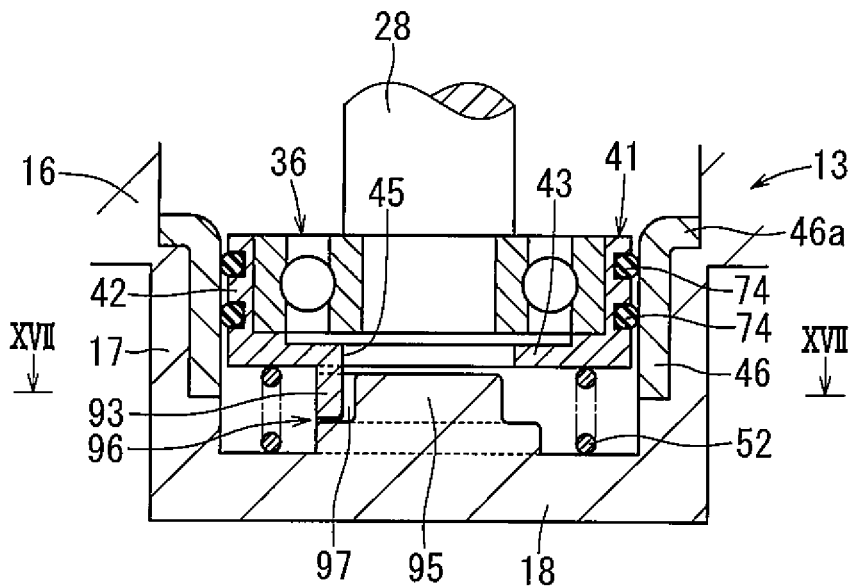
FIG. 16 is an enlarged cross-sectional view of a tenth embodiment of a support structure for a rotor shaft of a motor in accordance with the principles described herein.
Figure 17:
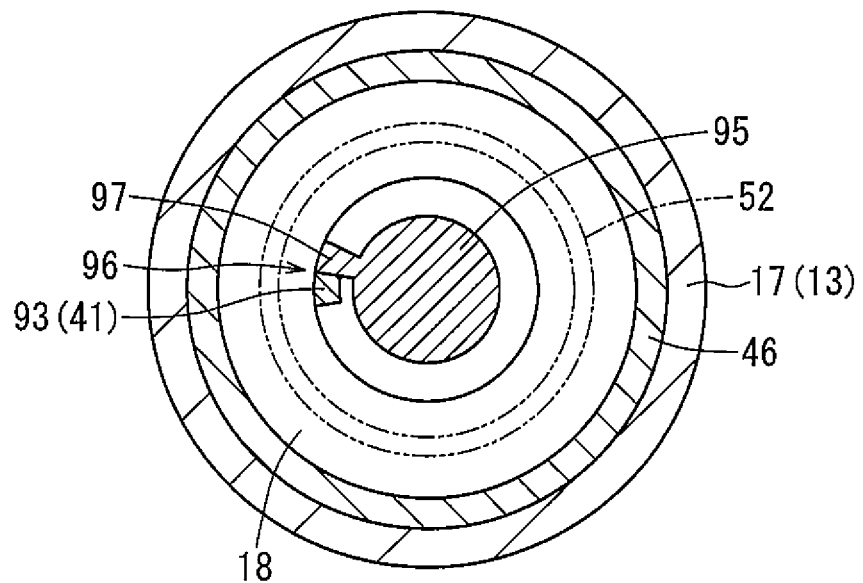
FIG. 17 is a cross-sectional view of the support structure of FIG. 16, taken along line XVII-XVII of FIG. 16.

A tenth embodiment similar to the ninth embodiment, with some changes will now be described. For purpose of clarity and conciseness, the changes will be described, while redundant explanations will be omitted. FIG. 16 is a cross-sectional view of the support structure for the rotor shaft 28. FIG. 17 is a cross-sectional view along line XVII-XVII of FIG. 16.

As shown in FIG. 16, a stepped base part 95 having a cylindrical shape with two levels is coaxially formed on the bottom wall part 18 of the casing body 13 by integral molding, instead of the base 88 including the engaging claw part 91 of the ninth embodiment. As illustrated in FIG. 16 and FIG. 17, an engaging claw part 97 is formed on a step part defined by an upper surface of a lower level part and an outer circumference of an upper level part of the stepped base part 95. A rotation prevention apparatus 96 includes the engaging claw part 97 and the engaged claw part 93. As shown in FIG. 16, the axial length of the retainer 46 is shortened, such that a lower part of the retainer 46, the part which does not correspond to the O-rings 74, is replaced with the resin part of the casing body 13. The engaging claw part 97 may also be referred to as an "engaging part" herein.

In accordance with the tenth embodiment, the engaging claw part 97 is formed on the step part of the stepped base part 95, so that the strength of the engaging claw part 97 can be increased. In addition, the retainer 46 is shortened in the axial direction, so that the cost for the retainer 46 can be decreased. The number of the rotation prevention apparatus 96 may be increased.

Figure 18:
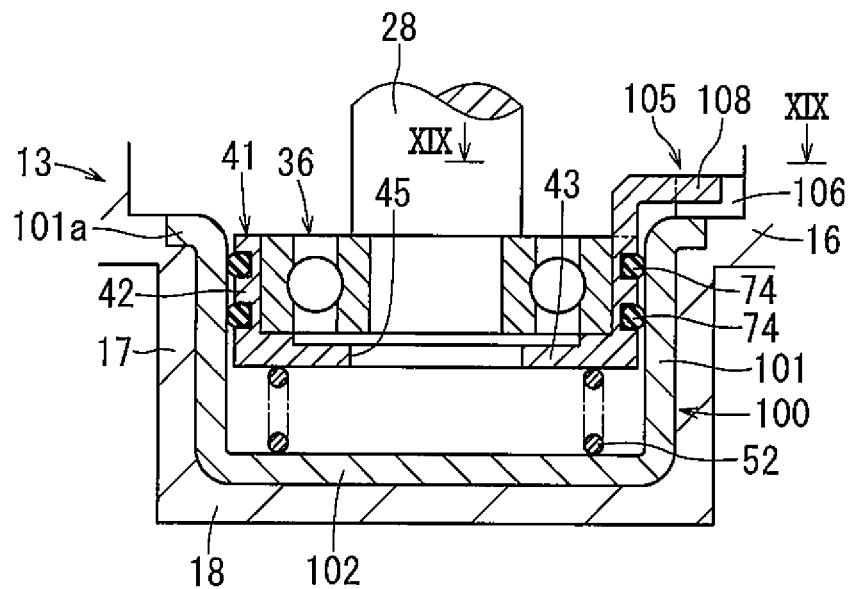
FIG. 18 is an enlarged cross-sectional view of an eleventh embodiment of a support structure for a rotor shaft of a motor in accordance with the principles described herein.
Figure 19:
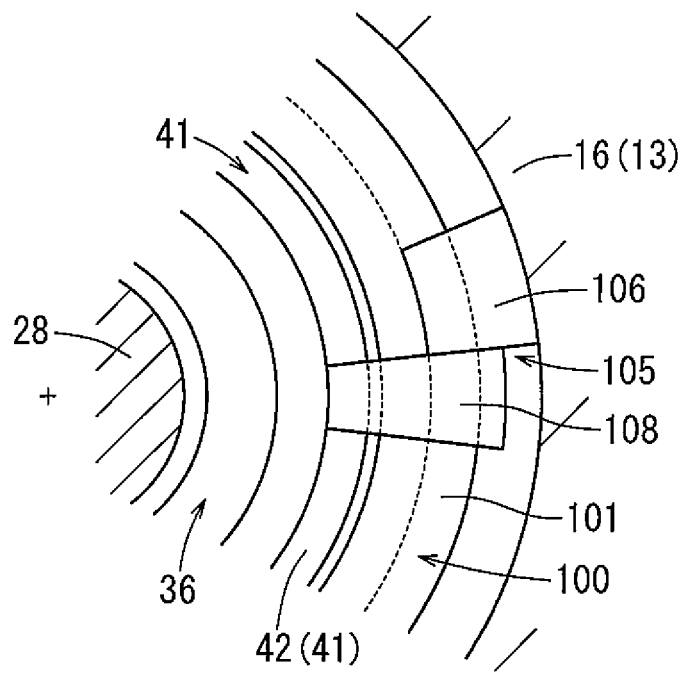
FIG. 19 is an enlarged cross-sectional view of a principle part of the motor taken along line XIX-XIX of FIG. 18, illustrating a top view of a rotation prevention apparatus of the support structure of FIG. 18.

An eleventh embodiment similar to the sixth embodiment, with some changes will now be described. For purpose of clarity and conciseness, the changes will be described, while redundant explanations will be omitted. FIG. 18 is a cross-sectional view of the support structure for the rotor shaft 28. FIG. 19 is a cross-sectional view along line XIX-XIX of FIG. 18.

As illustrated in FIG. 18, the eleventh embodiment includes a retainer 100, instead of the retainer 46 and the stopper member 48 of the sixth embodiment. The retainer 100 is formed in a cylindrical shape having a bottom. The retainer 100 includes a side wall part 101 having a hollow cylindrical shape, and a bottom wall part 102 closing a lower end of the side wall part 101. The retainer 100 is fixedly disposed in a recess defined by the extending tubular part 17 and the bottom wall part 18 of the casing body 13. The retainer 100 may also be referred to as a "fixed member" herein.

An upper end 101a of the side wall part 101 is curved radially outward. Accordingly, during the assembling process of the holder 41 with the retainer 100, the holder 41 can be smoothly fitted within the retainer 100 without damaging the O-rings 74.

The spring 52 is interposed between the bottom wall part 43 of the holder 41 and the bottom wall part 102 of the retainer 100. The side wall part 42 of the holder 41 is shaped so that it does not protrude downward from the lower surface of the bottom wall part 43.

A rotation prevention apparatus 105 for the holder 41 is provided between the casing body 13 and the holder 41. The rotation prevention apparatus 105 includes an engaging projection 106 formed on the casing body 13 and a protrusion 108 formed on the holder 41. The protrusion 108 is configured to engage the engaging projection 106 in the circumferential direction about the axis of the holder 41.

As shown in FIG. 18 and FIG. 19, the engaging projection 106 is formed at a corner defined by an inner circumference of a lower end of the tubular wall part 16 of the casing body 13 and an upper surface of the extending tubular part 17. The protrusion 108 is formed in an L-shape on an upper surface of the side wall part 42 of the holder 41. As illustrated in FIG. 19, the protrusion 108 is shaped so as to be configured to engage with the engaging projection 106 in the circumferential direction about the axis of the holder 41. The engaging projection 106 may also be referred to as an "engaging part" herein. The protrusion 108 may also be referred to as an "engaged part" herein. The number of rotation prevention apparatus 105 may be increased.

Figure 20:
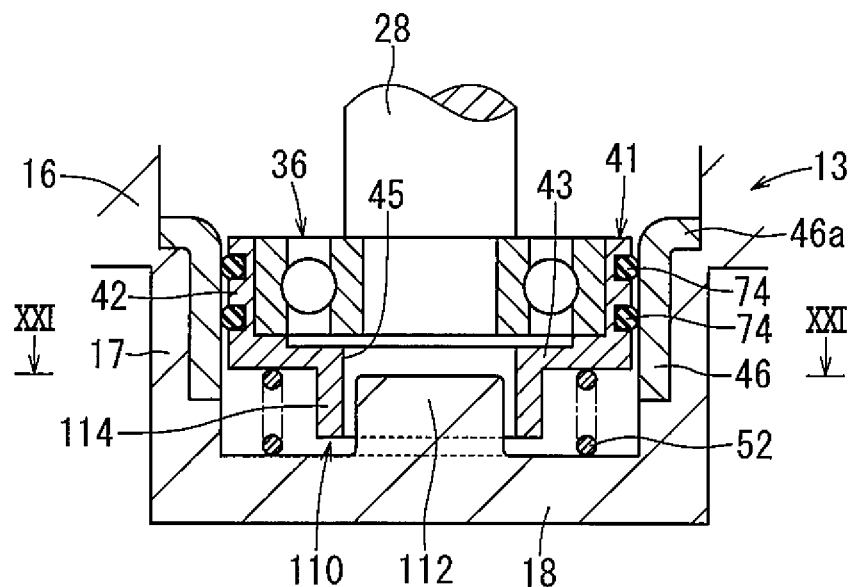
FIG. 20 is an enlarged cross-sectional view of a twelfth embodiment of a support structure for a rotor shaft of a motor in accordance with the principles described herein.
Figure 21:
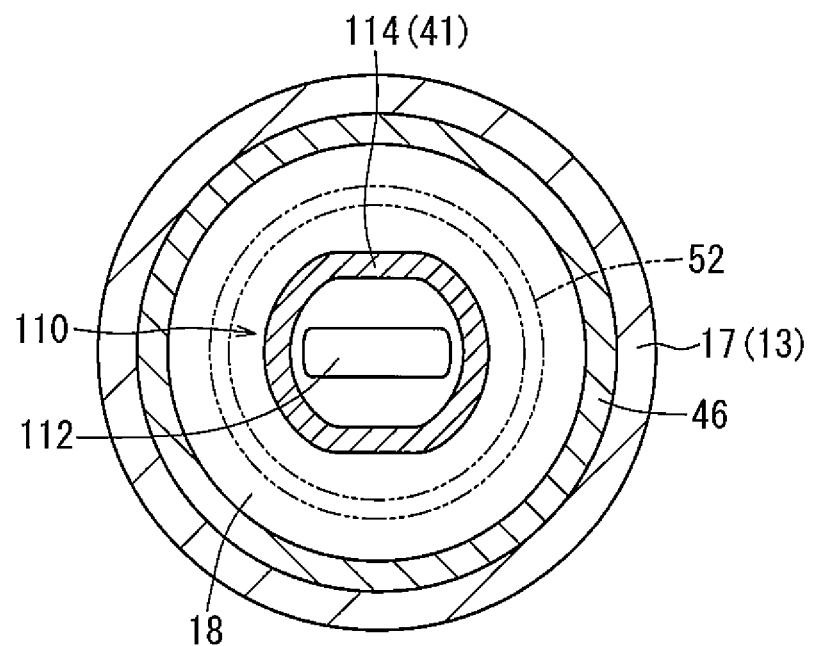
FIG. 21 is a cross-sectional view of the support structure of FIG. 20, taken along line XXI-XXI of FIG. 20.

A twelfth embodiment similar to the tenth embodiment, with some changes will now be described. For purpose of clarity and conciseness, the changes will be described, while redundant explanations will be omitted. FIG. 20 is a cross-sectional view of the support structure for the rotor shaft 28. FIG. 21 is a cross-sectional view along line XXI-XXI of FIG. 20.

As shown in FIG. 20, the twelfth embodiment includes a rotation prevention apparatus 110, instead of the rotation prevention apparatus 96 including the stepped base part 95 of the tenth embodiment. The rotation prevention apparatus 110 includes an engaging projection 112 formed on the bottom wall part 18 of the casing body 13 and a tubular part 114, which is formed on the holder 41 and is configured to engage with the engaging projection 112 in the circumferential direction about the axis of the holder 41.

The engaging projection 112 has a rectangular shape, and extends vertically upward from the bottom wall part 18 of the casing body 13. As illustrated in FIG. 21, the tubular part 114 has an elliptically tubular shape, and extends downward from an inner circumference of the bottom wall part 43 of the holder 41. The engaging projection 112 is inserted into the tubular part 114, such that when the holder 41 rotates, the tubular part 114 comes into contact with the engaging projection 112 in the circumferential direction about the axis of the holder 41. The engaging projection 112 may also be referred to as an "engaging part" herein. The tubular part 114 may also be referred to as an "engaged part" herein.

Figure 22:
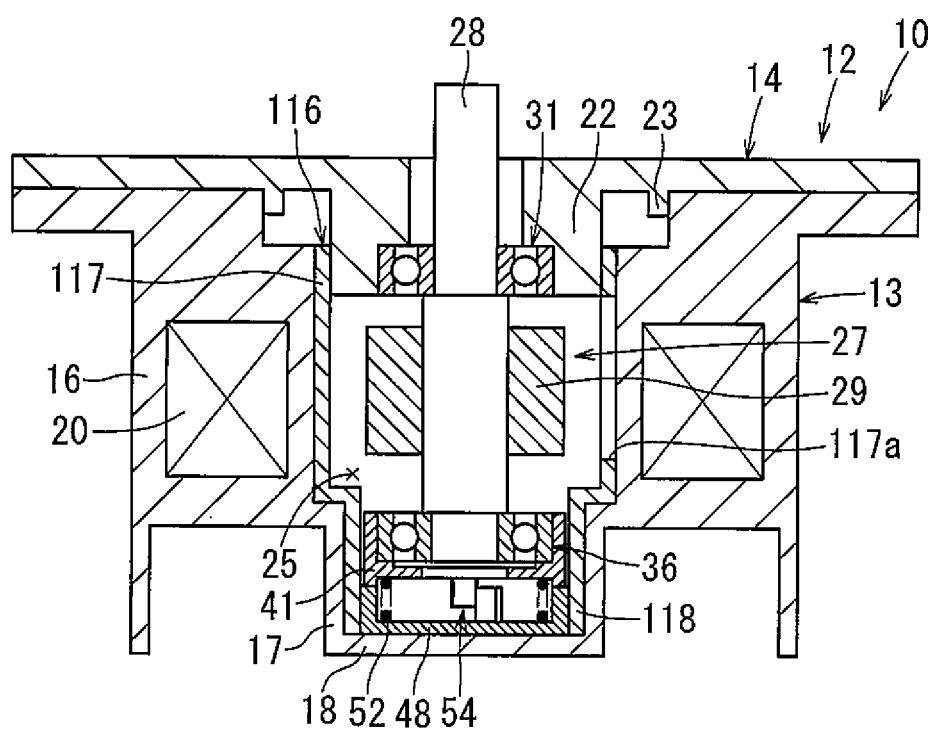
FIG. 22 is an enlarged cross-sectional view of a thirteenth embodiment of a motor in accordance with the principles described herein.
Figure 23:
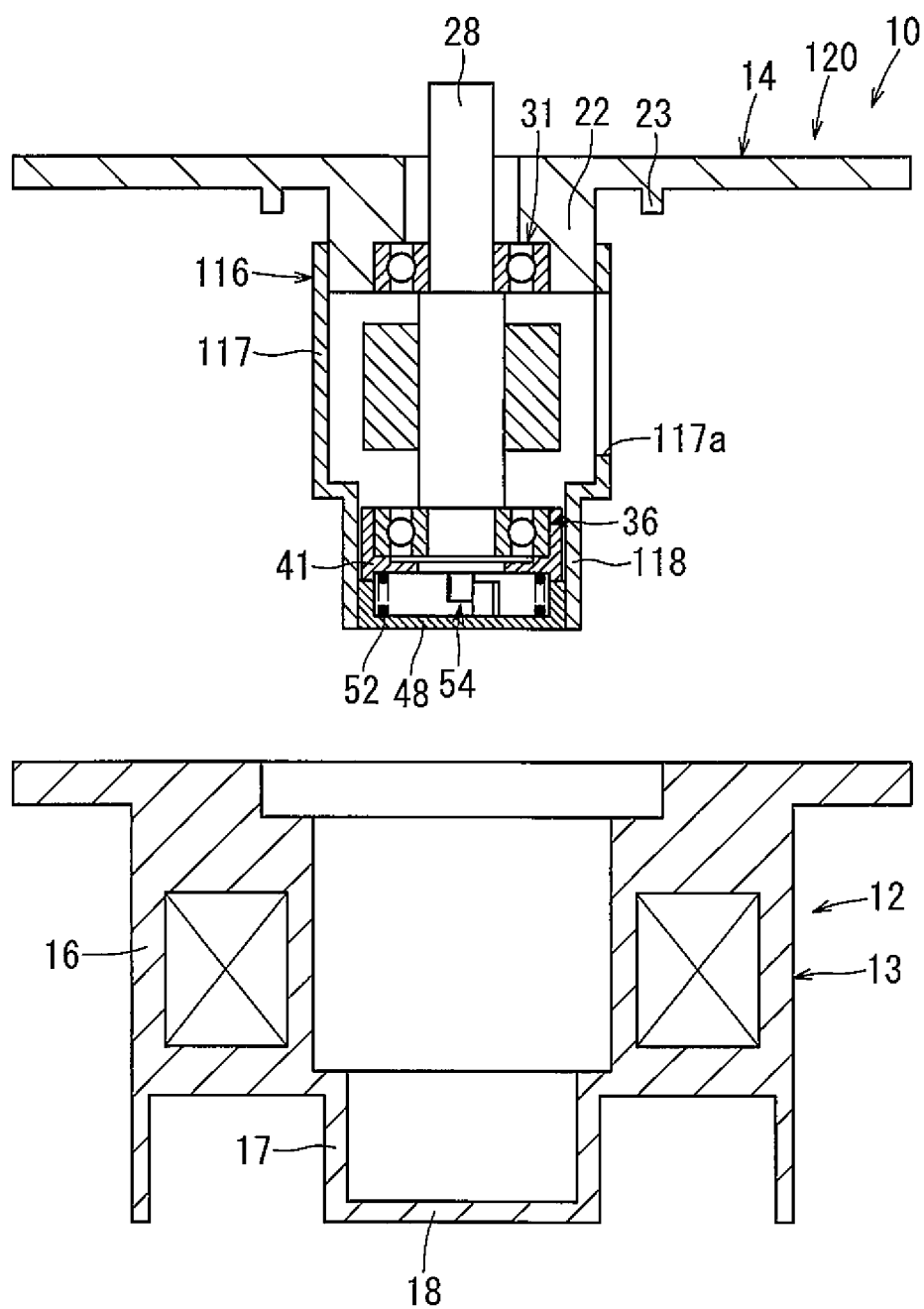
FIG. 23 is an exploded, cross-sectional view of the motor of FIG. 22.

A thirteenth embodiment similar to the first embodiment, with some changes will now be described. For purpose of clarity and conciseness, the changes will be described, while redundant explanations will be omitted. FIG. 22 is a cross-sectional view of the motor 10. FIG. 23 is an exploded cross-sectional view of the motor 10.

As illustrated in FIG. 22, the thirteenth embodiment includes a retainer 116, instead of the retainer 46 of the first embodiment. The retainer 116 has a stepped cylindrical shape configured to fit in the tubular wall part 16 and the extending tubular part 17 of the casing body 13. The retainer 116 includes a large diameter tubular part 117 and a small diameter tubular part 118. The large diameter tubular part 117 has a plurality of slits 117a, which extend axially and are arranged in the circumferential direction at regular intervals. The retainer 116 is made of a metal material having high thermal conductivity, such as stainless steel. The retainer 116 may also be referred to as a "fixed member" herein.

As shown in FIG. 22, the boss part 22 of the lid member 14, which supports the rotor shaft 28 of the rotor 27 via the bearing 31, is fixed to an upper end of the large diameter tubular part 117 of the retainer 116 by press-fitting. The holder 41, which supports the rotor shaft 28 of the rotor 27 via the bearing 36, is loosely fit within the small diameter tubular part 118 of the retainer 116. The stopper member 48 is fixed in the small diameter tubular part 118 of the retainer 116 by press-fitting, such that the stopper member 48 is engaged with the holder 41 via the spring 52. In this way, a rotor assembly 120 is assembled. As illustrated in FIG. 22 and FIG. 23, the motor 10 is assembled by fixing the retainer 116 of the rotor assembly 120 in the casing body 13 by press-fitting and fastening the lid member 14 to the casing body 13.

In accordance with the thirteenth embodiment, the lid member 14 and the retainer 116 are fixed by press-fitting, thereby improving the precision of the axis of the bearing 36. Further, the retainer 116 is made of metal, so that distortion of the axis caused by thermal deformation of the retainer 116 can be decreased. Heat generated by the bearing 36 can be transmitted to the lid member 114 via the retainer 116 and can be radiated from the lid member 14. The holder 41 and the stopper member 48 can be attached to the retainer 116 after the assembling process of the lid member 14 with the retainer 116. Thus, assembling workability of the stopper member 48 can be improved. The slits 117a are formed on the retainer 116, so that a magnetic force generated between the stator 20 and the rotor 27 can be increased. The retainer 116 may be made of resin.

Figure 24:
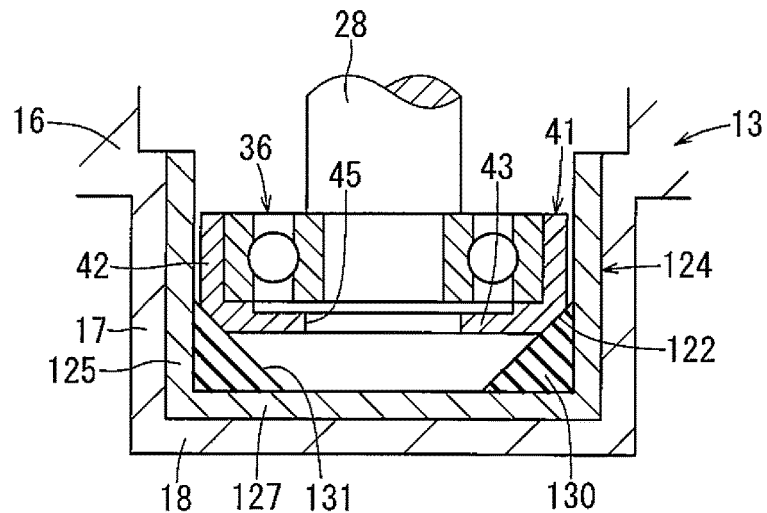
FIG. 24 is an enlarged cross-sectional view of a fourteenth embodiment of a support structure for a rotor shaft of a motor in accordance with the principles described herein.

A fourteenth embodiment similar to the first embodiment, with some changes will now be described. For purpose of clarity and conciseness, the changes will be described, while redundant explanations will be omitted. FIG. 24 is a cross-sectional view of the support structure for the rotor shaft 28.

As shown in FIG. 24, in the fourteenth embodiment, the stopper member 48 and the rotation prevention apparatus 54 of the first embodiment are omitted. The side wall part 42 of the holder 41 is shaped so as not to protrude downward from the lower surface of the bottom wall part 43. An abutted surface 122 composed of a cone-shaped surface is formed on an outer circumference of a corner defined between the side wall part 42 and the bottom wall part 43 of the holder 41. More specifically, the abutted surface 122 has a frustoconical shape with a diameter that decreases toward the lower side and that extends downward from the outer circumference of the side wall part 42.

A retainer 124 of the fourteenth embodiment has a hollow cylindrical shape with a bottom. The retainer 124 includes a side wall part 125 with a hollow cylindrical shape and a bottom wall part 127 closing a lower end of the side wall part 125. The retainer 124 is fixedly disposed in a recess defined by the extending tubular part 17 and the bottom wall part 18 of the casing body 13.

An annular, elastic rubber member 130 is provided at a corner defined by the side wall part 125 and the bottom wall part 127 of the retainer 124. The rubber member 130 has a right angled triangular cross-section along the axial direction and has an abutting surface 131 having a frustoconical shaped surface at its inner circumference. The abutted surface 122 of the holder 41 elastically abuts the abutting surface 131 of the rubber member 130 in a surface contact manner. The retainer 124 may also be referred to as a "fixed member" herein. The rubber member 130 may also be referred to as a "rotation prevention apparatus" or an "elastic member" herein.

In accordance with the fourteenth embodiment, the rubber member 130 elastically biases the holder 41 upward and prevents rotation of the holder 41 due to elastic contact with the holder 41. In addition, the retainer 124 is made of metal, so that thermal deformation of the retainer 124 can be suppressed. Thus, a decrease in adhesion between the holder 41 and the rubber member 130 caused by heat can be suppressed. The abutted surface 122 of the holder 41 and the abutting surface 131 of the rubber member 130 abut each other in a surface contact manner, thereby increasing the frictional force therebetween. As a result, the co-rotation of the holder 41 caused by the outer ring 37 may be prevented.

Figure 25:
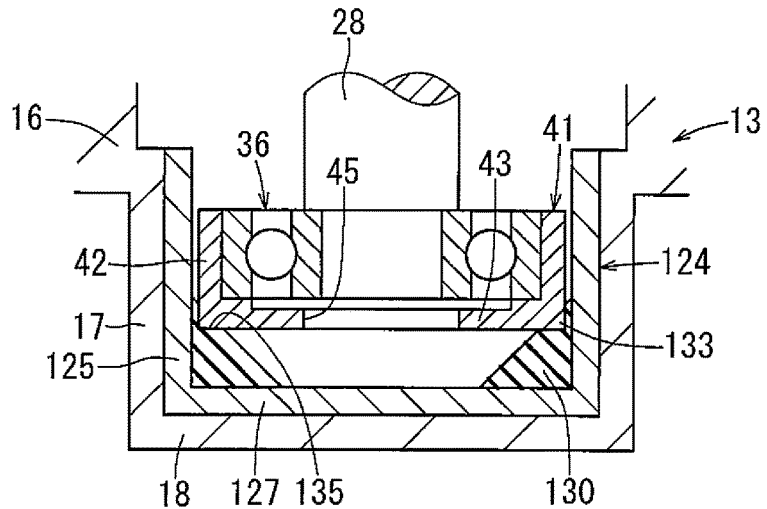
FIG. 25 is an enlarged cross-sectional view of a fifteenth embodiment of a support structure for a rotor shaft of a motor in accordance with the principles described herein.

A fifteenth embodiment similar to the fourteenth embodiment, with some changes will now be described. For purpose of clarity and conciseness, the changes will be described, while redundant explanations will be omitted. FIG. 25 is a cross-sectional view of the support structure for the rotor shaft 28.

As shown in FIG. 25, the fifteenth embodiment includes a corner part 133, which has substantially a right angle in a cross-section along the axis of the holder 41 and which is defined by the side wall part 42 and the bottom wall part 43 of the holder 41. The corner part 133 extends over the whole circumference of the holder 41. An annular fitting groove 135, having an L-shaped cross-section fitted with the corner part 133 of the holder 41, is formed in the rubber member 130.

Figure 26:
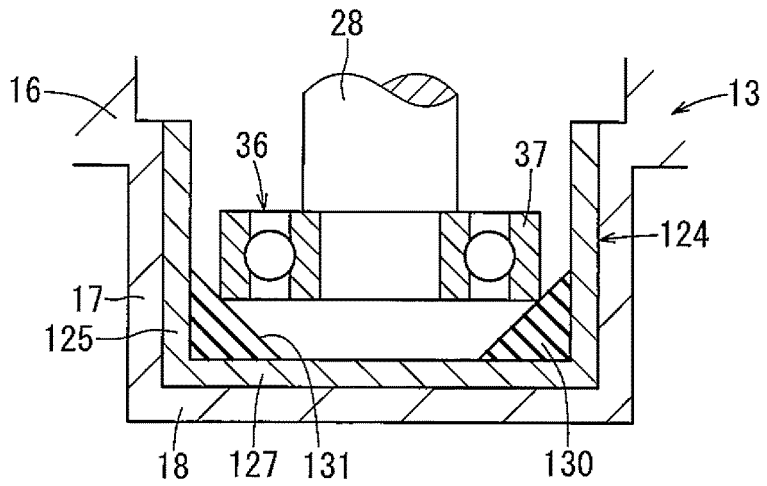
FIG. 26 is an enlarged cross-sectional view of a sixteenth embodiment of a support structure for a rotor shaft of a motor in accordance with the principles described herein.

A sixteenth embodiment similar to the fourteenth embodiment, with some changes will now be described. For purpose of clarity and conciseness, the changes will be described, while redundant explanations will be omitted. FIG. 26 is a cross-sectional view of the support structure for the rotor shaft 28.

As illustrated in FIG. 26, in the sixteenth embodiment, the holder 41 of the fourteenth embodiment is omitted. A corner defined by an outer circumference of the outer ring 37 of the bearing 36 and a lower surface of the same elastically abuts the abutting surface 131 of the rubber member 130.

In accordance with the sixteenth embodiment, the outer ring 37 of the bearing 36 is loosely fit within a recess defined by the side wall part 125 and the bottom wall part 127 of the retainer 124, such that rotation of the outer ring 37 is prevented due to elastic contact with the rubber member 130. That is, it is not necessary to attach the outer ring 37 to the fixed member on the stator 20 side by press-fitting, so that the dimensional accuracy required for the assembling process of the bearing 36 can be decreased, thereby decreasing the cost thereof. In addition, the rubber member 130 can decrease the transmission of vibrations from the rotor 27 side to the stator 20 side, thereby improving the quietness of the motor 10.

Figure 27:
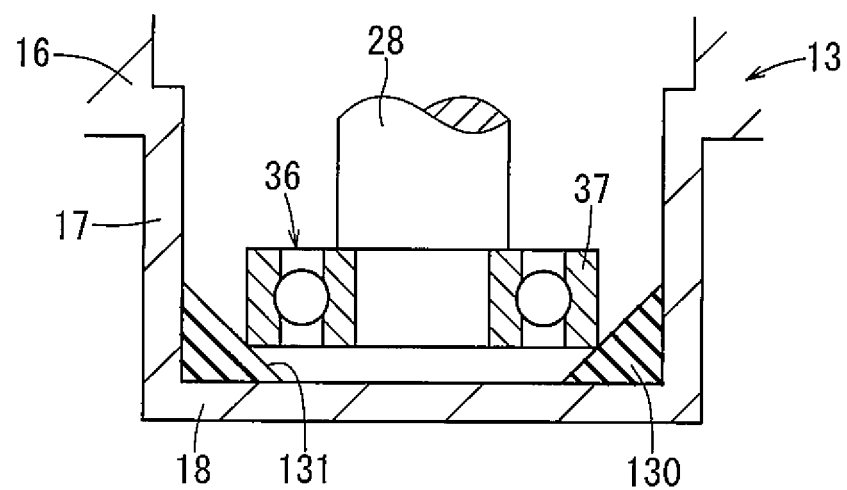
FIG. 27 is an enlarged cross-sectional view of a seventeenth embodiment of a support structure for a rotor shaft of a motor in accordance with the principles described herein.

A seventeenth embodiment similar to the sixteenth embodiment, with some changes will now be described. For purpose of clarity and conciseness, the changes will be described, while redundant explanations will be omitted. FIG. 27 is a cross-sectional view of the support structure for the rotor shaft 28.

As shown in FIG. 27, in the seventeenth embodiment, the retainer 124 of the sixteenth embodiment is omitted. The rubber member 130 is disposed at a corner defined by the extending tubular part 17 and the bottom wall part 18 of the casing body 13.

The present disclosure is not limited to the above-described embodiments, and may be modified without departing from the gist of the present disclosure. For example, the rotation prevention apparatus is any structure provided between the fixed member and the holder 41 for preventing the relative rotation of the holder 41, so that the shape thereof may be changed as necessary. The spring 52 may be omitted.

The present disclosure discloses various aspects of the technology. A first aspect is a motor including a stator and a rotor having a rotor shaft. The motor includes a bearing, including an inner ring and an outer ring rotating relative to each other, and a holder supporting the outer ring. The inner ring is supported by the rotor shaft. The holder is loosely fitted with a fixed member on the stator side. A rotation prevention apparatus configured to prevent rotation of the holder is provided between the fixed member and the holder.

In accordance with the first aspect, the holder supporting the outer ring of the bearing is loosely fitted with the fixed member on the stator side, and the rotation prevention apparatus prevents the holder from rotating with respect to the fixed member. Thus, it is not necessary to attach the holder to the fixed member by press-fitting, so that accuracy management in connection with the assembling process of the bearing can be simplified, thereby decreasing the cost thereof.

A second aspect corresponds to the first aspect, wherein the rotation prevention apparatus comprises an engaging part formed on the fixed member and an engaged part formed on the holder. The engaging part and the engaged part are capable of engaging with each other in a circumferential direction of the holder.

In accordance with the second aspect, rotation of the holder can be prevented without any additional members. Thus, an increase in the cost for the rotation prevention apparatus can be suppressed.

A third aspect corresponds to the second aspect, wherein at least one of the engaging part and the engaged part includes an inclined guide surface configured to decrease the interaction between the engaging part and the engaged part during an assembling process of the holder with the fixed member.

In accordance with the third aspect, the inclined guide surface formed on at least one of the engaging part and the engaged part can decrease the interaction between the engaging part and the engaged part during the assembling process of the holder with the fixed member.

A fourth aspect corresponds to the first aspect, wherein the rotation prevention apparatus is composed of an elastic member, which has elasticity and is interposed between the fixed member and the holder.

In accordance with the fourth aspect, the elastic member of the rotation prevention apparatus can prevent rotation of the holder due to elastic contact with the fixed member and the holder. In addition, the elastic member can reduce the transmission of vibrations from the rotor side to the stator side, so that the quietness of the motor can be improved.

A fifth aspect corresponds to the fourth aspect, wherein the elastic member is formed in an annular shape and is disposed to close an annular gap between the fixed member and the holder. The holder has a through hole communicating an interior with an exterior of the annular gap.

In accordance with the fifth aspect, the annular elastic member is disposed to close the annular gap between the fixed member and the holder. Thus, there is a possibility that the annular gap between the fixed member and the holder is sealingly closed during the assembling process of the holder with the fixed member. In such case, air held in the annular gap can be released via the through hole of the holder. Accordingly, an assembling workability of the holder to the fixed member can be improved.

A sixth aspect corresponds to the fourth aspect, wherein the elastic member is formed in an annular shape and is disposed in an annular gap between the fixed member and the holder. The elastic member has a contact part abutting at least one of the fixed member and the holder, so as to define a gap axially passing therethrough.

In accordance with the sixth aspect, the annular elastic member is disposed within the annular gap between the fixed member and the holder. Thus, there is a possibility that a space on the fixed member side is sealingly closed during the assembling process of the holder to the fixed member. In such a state, the contact part of the elastic member abuts at least one of the fixed member and the holder, so as to define a gap axially passing therethrough. So, air held in the space on the fixed member side can be released via the gap. Accordingly, the assembling workability of the holder with the fixed member can be improved.

A seventh aspect corresponds to any one of the first to sixth aspects, wherein the holder has a hollow cylindrical shape having a bottom. The bottom of the holder has a communication hole communicating an interior with an exterior of the holder.

In accordance with the seventh aspect, there is a possibility that the space on the fixed member side is sealingly closed during the assembling process of the holder with the fixed member. In this state, the air held on the fixed member side can be released via the communication hole of the holder. Accordingly, the assembling workability of the holder with the fixed member can be improved.

An eighth aspect is a motor including a stator and a rotor having a rotor shaft. The motor includes a bearing including an inner ring and an outer ring capable of rotating relative to each other. The inner ring is supported by the rotor shaft. The outer ring is loosely fitted with the fixed member on the stator side. A rotation prevention apparatus, which is configured to prevent rotation of the outer ring, is provided between the fixed member and the outer ring. The rotation prevention apparatus is composed of an elastic member having elasticity and being interposed between the fixed member and the outer ring.

In accordance with the eighth aspect, the outer ring of the bearing is loosely fitted with the fixed member on the stator side, and rotation of the outer ring is prevented by elastic contact of the elastic member. Thus, it is not necessary to fit the outer ring with the fixed member by press-fitting. Accordingly, the accuracy management in connection with the assembling process of the bearing can be simplified, thereby decreasing the cost thereof. In addition, the elastic member can decrease the transmission of vibrations from the rotor side to the stator side, so that the quietness of the motor can be improved.

The invention claimed is:

1. A motor, comprising:
   a stator;
   a rotor including a rotor shaft;
   a bearing including an inner ring and an outer ring, wherein the inner ring and the outer ring are configured to rotate relative to each other, and wherein the inner ring is configured to support the rotor shaft;
   a holder supporting the outer ring, wherein the holder is disposed within a fixed member fixed on the stator such that the holder is spaced apart from the fixed member in a radial direction of the holder; and
   a rotation prevention apparatus configured to prevent rotation of the holder relative to the fixed member, wherein the rotation prevention apparatus is disposed between the fixed member and the holder, and wherein the rotation prevention apparatus is positioned outside the bearing in an axial direction of the bearing;
   wherein:
   the rotation prevention apparatus comprises an engaging part formed on the fixed member and an engaged part formed on the holder; and
   the engaging part and the engaged part are configured to engage each other in a circumferential direction of the holder.

2. The motor of claim 1, wherein at least one of the engaging part and the engaged part includes an inclined guide surface configured to decrease an interaction between the engaging part and the engaged part while assembling the holder with the fixed member.

3. The motor of claim 1, wherein:
   the holder has a hollow cylindrical shape with a bottom, and
   the bottom of the holder has a through hole communicating an interior and an exterior of the holder with each other therethrough.

4. A motor, comprising:
   a stator;
   a rotor including a rotor shaft;
   a bearing including an inner ring and an outer ring, wherein the inner ring and the outer ring are configured to rotate relative to each other, and wherein the inner ring is configured to support the rotor shaft;

a holder supporting the outer ring, wherein the holder is disposed within a fixed member fixed on the stator such that the holder is spaced apart from the fixed member in a radial direction of the holder; and a rotation prevention means for preventing rotation of the holder relative to the fixed member, wherein the rotation prevention means is disposed between the fixed member and the holder, wherein the rotation prevention means is composed of an elastic member, which has elasticity and is interposed between the fixed member and the holder, and wherein the elastic member elastically and radially abuts the fixed member and the holder so as to prevent rotation of the holder relative to the fixed member.

5. The motor of claim 4, wherein:

the elastic member has an annular shape and is positioned to close an annular gap between the fixed member and the holder; and the holder has a through hole communicating an interior and an exterior of the annular gap.

6. The motor of claim 4, wherein:

the elastic member has an annular shape and is positioned in an annular gap between the fixed member and the holder; and the elastic member has a contact part abutting at least one of the fixed member and the holder so as to define a gap axially passing therethrough.

7. The motor according to claim 4, wherein:

the holder has a hollow cylindrical shape with a bottom; and the bottom of the holder has a through hole communicating an interior and an exterior of the holder.

8. A motor, comprising:

a stator;

a rotor having a rotor shaft;

a bearing including an inner ring and an outer ring, wherein the inner ring and the outer ring are configured to rotate relative to each other, wherein the inner ring is configured to support the rotor shaft, and wherein the outer ring is disposed within a fixed member fixably coupled to the stator such that the outer ring is spaced apart from the fixed member in a radial direction of the outer ring; and a rotation prevention means configured to prevent rotation of the outer ring and positioned between the fixed member and the outer ring, wherein the rotation prevention means comprises an elastic member having elasticity and interposed between the fixed member and the outer ring, and wherein the elastic member elastically and radially abuts the fixed member and the outer ring so as to prevent rotation of the outer ring.

* * * * *